United States Patent [19]

Tully

[11] Patent Number: 5,501,176
[45] Date of Patent: Mar. 26, 1996

[54] PET FEEDING APPARATUS

[76] Inventor: Tara S. Tully, 920 Meadow Creek Dr., Apt. 2118, Irving, Tex. 75038

[21] Appl. No.: 307,512
[22] Filed: Sep. 16, 1994
[51] Int. Cl.⁶ .................. A01K 5/01; A01K 7/00
[52] U.S. Cl. ........................................ 119/61
[58] Field of Search ................. 119/18, 51.5, 61; 248/149, 150, 125

[56] References Cited

U.S. PATENT DOCUMENTS

| | | | |
|---|---|---|---|
| 2,997,022 | 8/1961 | Kay | 119/61 |
| 3,651,787 | 3/1972 | Cooper | 119/51 |
| 4,044,723 | 8/1977 | Fitzpatrick | 119/61 |
| 4,205,629 | 6/1980 | Wix | 119/61 |
| 4,658,759 | 4/1987 | Brown | 119/61 |
| 4,955,322 | 9/1990 | Rodriguez | 119/61 X |
| 4,976,223 | 12/1990 | Pierce | 119/61 |
| 4,995,342 | 2/1991 | Hinrichs et al. | 119/61 X |
| 5,125,364 | 6/1992 | Sagucio | 119/61 |
| 5,144,912 | 9/1992 | Hammett et al. | 119/61 |

Primary Examiner—Thomas Price
Attorney, Agent, or Firm—H. Dennis Kelly; Jeffrey T. Hubbari; Timmons & Kelly

[57] ABSTRACT

A bracket stands upright on a base attached to the bracket with a hinge, the hinge being biased by a spring to hold the bracket upright and at right angles to the base. The bracket has horizontal slots located at intervals along its vertical length. A tray, containing holes designed to hold a pair of bowls, is attached to the bracket by a hinge. One of the hinge leaves connects to the tray. The free hinge leaf terminates in a flange adapted to fit in one of the horizontal slots on the bracket to support and hold the hinge and tray on the bracket. The height of the tray may be adjusted by placing the free hinge leaf into different slots. The hinge is configured to prevent motion of the tray downward below a horizontal position. The hinges allow the structure to be folded flat to allow storage in a narrow space when the structure is not in use.

10 Claims, 2 Drawing Sheets

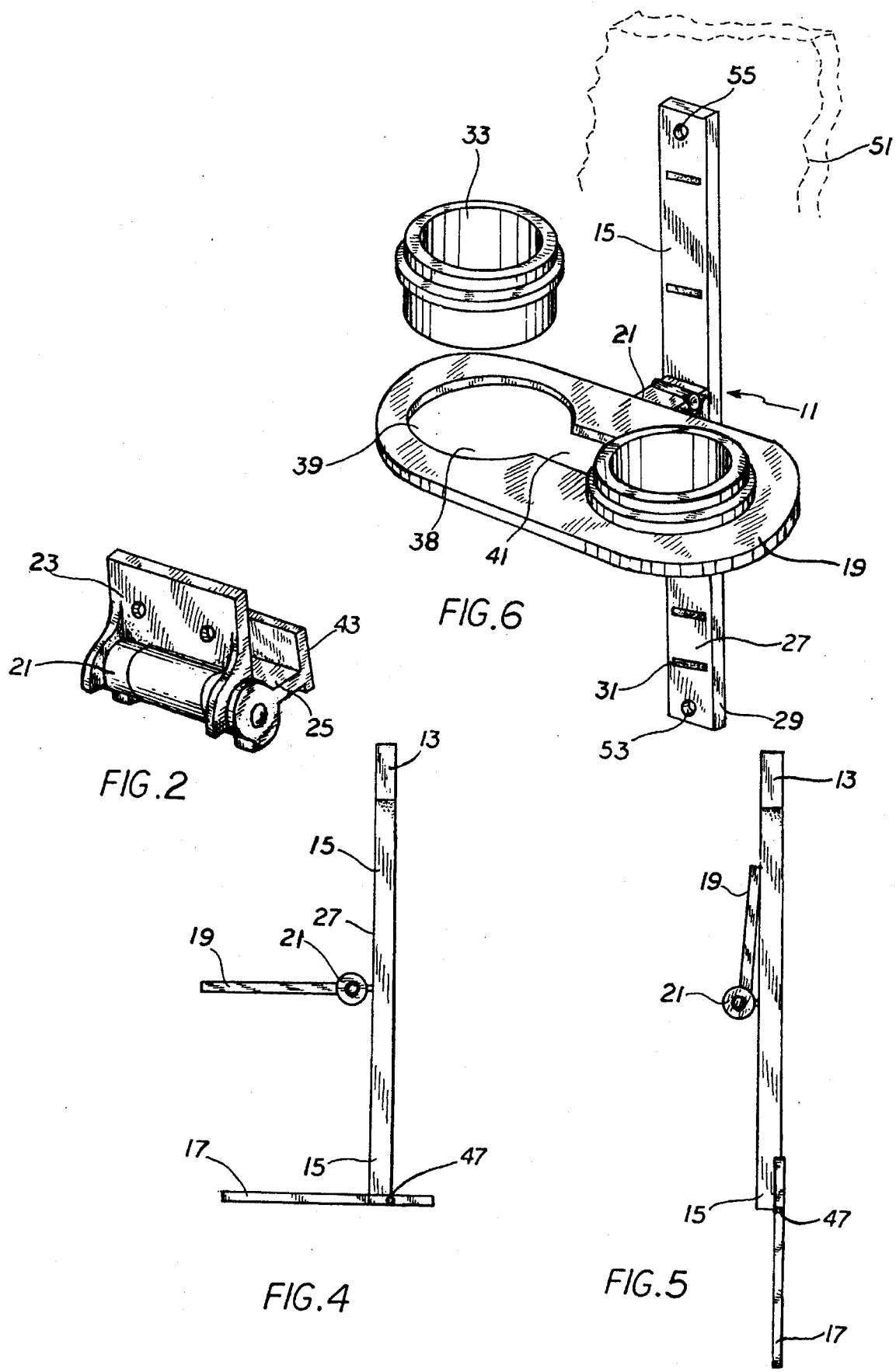

5,501,176

PET FEEDING APPARATUS

BACKGROUND OF THE INVENTION

1. Field of the Invention

This invention relates in general to apparatus for feeding animals. In particular, the invention relates to pet feeders which may be adjusted for height.

2. Description of the Related Art

Bowls for holding food and water for dogs and cats are traditionally made to sit on the floor. This can be inconvenient for larger breeds of dogs and other large pets, which have to lean over at a steep angle to reach the bowls. It can also be inconvenient for the owner to bend to the floor to set the bowls down, fill them with food and water and retrieve them.

U.S. Pat. No. 4,205,629, issued to Wix, teaches a structure using a vertical support member and a frame member, both made from square metal tubing. The frame member is shaped to hold a bowl and has brackets attached to the support member with bolts and wing nuts. The frame member can be set to a different height by detaching the bolts and nuts, moving the bracket to a different set of holes, and reinstalling the bolts and wing nuts. The structure is not designed to collapse into a small space when not in use.

A need remained for a pet feeding apparatus that can collapse into a small space when not in use. A structure with a minimum number of parts was desired, as was a structure that does not require that small pieces of mounting hardware be taken apart and reassembled for each readjustment of height. Also, as always, a less expensive apparatus that is easier to use was desired.

SUMMARY OF THE INVENTION

The objects of the invention are to hold food and water for pets at a selected height above the floor, and to allow this height to be adjusted. These objects are generally met by a vertical bracket and a tray designed to hold at least one bowl. The bracket has several horizontal slots located at intervals along the length of the bracket. A hinge, having one leaf attached to the tray, has a free leaf adapted to fit into one of the horizontal slots to hold the tray at any of a number of preset heights.

Another object of the invention is to provide a mechanism to allow the feeder to be put into a storage position, so that the apparatus takes up less of the living space when not in use. This object is also achieved by the hinge connecting the tray to the bracket. While the apparatus is in use, the hinge holds the tray in a horizontal position. When the apparatus is not in use, the hinge allows the tray to be tilted up and over the hinge so that the tray rests against the bracket when not in use.

The above, as well as additional objects, features, and advantages of the invention will become apparent in the following detailed description.

BRIEF DESCRIPTION OF THE DRAWINGS

FIG. 2 is a perspective view of the tray hinge.

FIG. 4 is a side elevation of a pet feeding apparatus according to the invention, showing the tray and base in the horizontal position.

FIG. 5 is a side elevation of a pet feeding apparatus according to the invention, with the tray in the upper position and resting against the bracket and the base in line with the bracket.

FIG. 6 is a partially exploded perspective view of an alternative embodiment of a pet feeding apparatus according to the invention, as it appears when set up, showing how the bowls may be inserted and removed.

DESCRIPTION OF THE PREFERRED EMBODIMENT

Figures 1, 3:
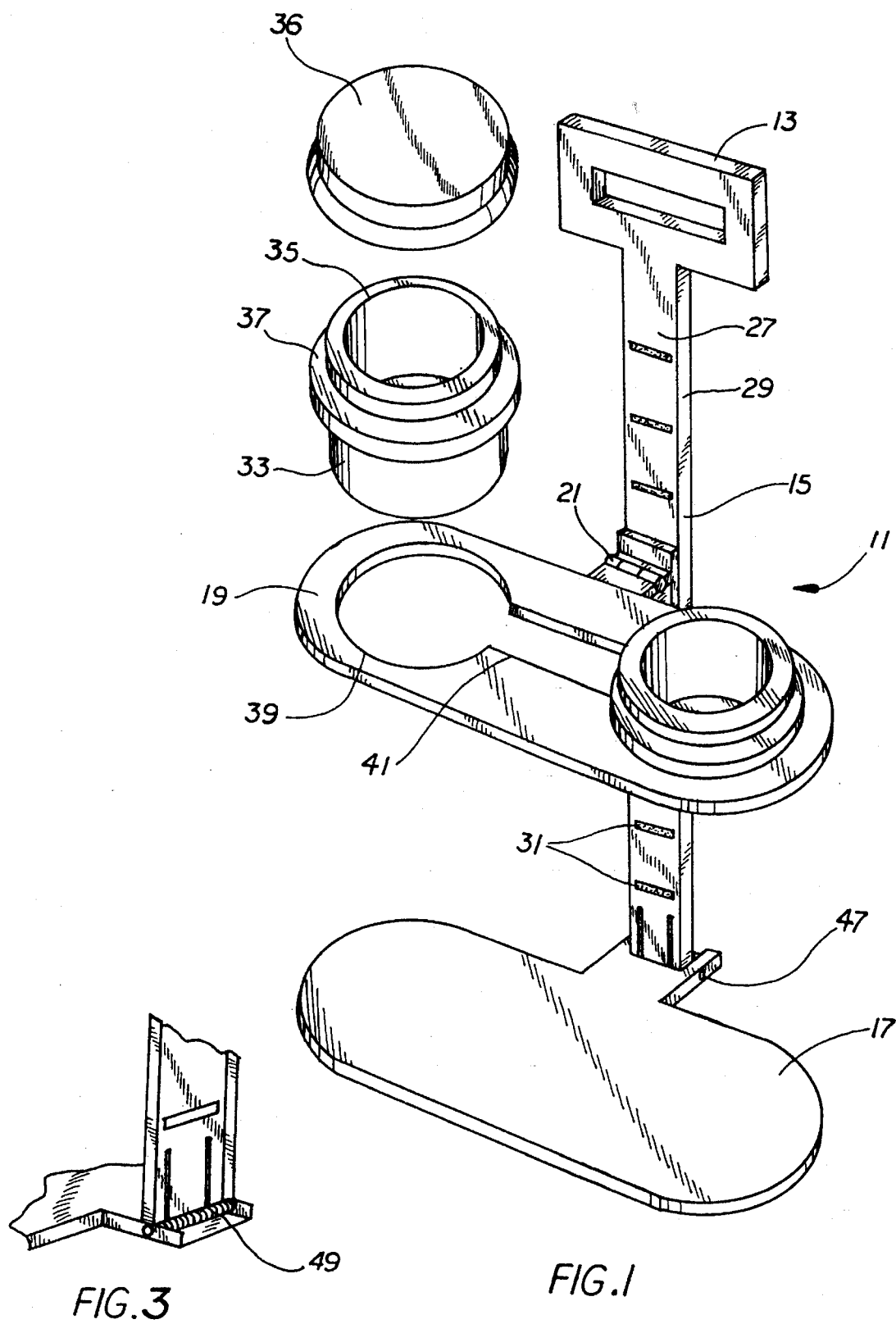
FIG. 1 is a partially exploded perspective view of a pet feeding apparatus according to the invention, as it appears when set up, showing how the bowls may be inserted and removed.
FIG. 3 is a perspective view of the base hinge.

FIG. 1 shows the preferred embodiment of a pet feeding apparatus 11 of the invention. The feeding apparatus 11 basically includes a handle 13, a bracket 15, a base 17, a tray 19 and a hinge 21 having one leaf 23 attached to the tray 19 and the other leaf 25 adapted to interfit with the bracket 15.

The bracket 15 has a front surface 27 and two side surfaces 29. For purposes of illustration, the bracket 15 is shown constructed from a two foot section of angle iron having a C-shaped cross section. The bracket 15 may, however, be made with any configuration or material providing the necessary strength and depth, such as square metal tubing or injection molded plastic. The front surface 27 has several horizontal slots 31 located at intervals along the length of the bracket 15. These slots 31 receive the second leaf 25 of the hinge 21.

The tray 19 is fabricated of flat plastic sheet in a generally oval shape and is designed to hold two bowls 33 that are cylindrical in shape with a mouth 35 and a lip 37. Each bowl 33 may be provided with a lid 36. The tray 19 contains an opening 38 configured in the form of two round holes 39 connected by a gap 41. The holes 39 are sized to hold the bowls 33 with the lip 37 on each bowl 33 resting on the tray 19 during use. The size of the bowls 33 and the holes 39 may be varied. The gap 41 is sized to admit a hand for gripping and removing a bowl 33.

The bowls 33 are an integral element of the feeding apparatus 11. The device may however be manufactured without the bowls 33. The user would then make use of their own bowls. In that case, a set of inexpensive snap-in inserts (not shown) could be provided which would vary the diameters of the holes 39 to accommodate bowls of different size.

As shown in FIG. 2, the hinge 21 has two leaves 23 and 25. The first hinge leaf 23 may be connected to the tray 19 by any means known in the industry; the second hinge leaf 25 swings freely. The end of the second leaf 25 distal from the first leaf 23 terminates in a flange 43 that is adapted to fit into one of the horizontal slots 31 on the bracket 15 in a manner similar to that used to mount hooks on pegboard. When inserted into the slot 31, the flange 43 and the second leaf 25 support the hinge 21 and the tray 19 on the bracket 15. The height of the tray 19 may be adjusted by placing the flange 43 into different slots 31. The hinge 21 is designed so that the hinge leaves 23 and 25 will abut against each other when they are 180 degrees apart, which prevents downward motion of the tray 19 below a position horizontal to the floor.

Turning to FIGS. 1 and 3, the base 17 is a large, generally flat sheet of the same material as the bracket 15, and attaches to the bracket 15 via a hinge 47. A spring 49 biases the hinge 47 to press on the base 17 and bracket 15 so as to keep the base 17 at right angles to the bracket 15. The device would then be self supporting for use. The base 17 can be pivoted to a position in line with the bracket 15 for storage as described below. The base 17 should be weighted to help hold the apparatus in place while the pet is feeding.

A less expensive structure would eliminate the hinge 47 and spring 49. In their place, a hole (not shown) would be defined within the base 17 into which the bracket 15 would be inserted and removed. In addition, the bracket 15 and base 17 could be manufactured as a single piece if the ability to fold up the base is not required.

FIGS. 4 and 5 illustrate the structure's ability to collapse into a small space. With the bowls 33 removed, the tray 19 may be manually pivoted upward until the outer edge of the tray 19 rests against the front surface 27 of the bracket 15. The tray's center of gravity will maintain the tray 19 in this position. The base 17 can be pivoted into a position in line with the bracket 15. The structure can then be stored in a narrow space such as the gap between a refrigerator and a wall or cabinet.

FIG. 6 depicts an alternative embodiment that is permanently mounted to a wall 51 or other vertical support surface. In this embodiment, the handle 13 and base 47 would be absent, and the bracket 15 would have holes 53 for affixing the bracket 15 to the wall 51 with screws 55. The bracket side surfaces 29 should provide sufficient offset of the front surface 27 from the wall 51 to allow the hinge 21 to interfit with the bracket 15 as previously described.

The feeding apparatus of the invention has several advantages over the prior art. The height of the tray can be quickly and easily set. It has no detachable parts which can be lost. The tray and base can be pivoted to allow storage in a narrow space when not in use.

The invention has been shown in two embodiments. It should be apparent to those skilled in the art that the invention is not so limited, but is susceptible to various changes and modifications without departing from the spirit of the invention.

I claim:

1. A pet feeding apparatus, comprising:

a vertical bracket having a plurality of horizontal slots spaced at intervals along the vertical length of the bracket;

a tray containing an opening configured to hold a bowl; and a tray hinge having a first leaf and a second leaf, the first leaf being attached to the tray and the second leaf being removably attached to any one of the slots, the tray hinge allowing the tray to be pivoted between an upper position and a lower position.

2. A pet feeding apparatus as recited in claim 1, wherein the tray hinge is configured to prevent movement of the tray and the first leaf of the tray hinge downward below a horizontal position.

3. A pet feeding apparatus as recited in claim 2, wherein the tray is horizontal in the lower position, while in the upper position the tray stands above the tray hinge with the tray resting against the bracket.

4. A pet feeding apparatus as recited in claim 1, wherein the opening is in the form of two circular holes connected by a gap, the gap sized to admit a hand for gripping a bowl for inserting and removing the bowl from the tray.

5. A pet feeding apparatus as recited in claim 4, further comprising a bowl removably positioned in one of the holes in the tray.

6. A pet feeding apparatus as recited in claim 5, wherein the bowl has a mouth and a lip near the mouth to hold the bowl in one of the holes in the tray.

7. A pet feeding apparatus as recited in claim 5, wherein the bowl has a mouth, and wherein the apparatus further comprises a lid removably attached to the mouth of the bowl.

8. A pet feeding apparatus as recited in claim 1, further comprising a handle integrally attached to the top of the vertical bracket and a base pivotably attached to the bottom of the vertical bracket with a base hinge, the base hinge having a spring to bias the bracket and base to maintain the bracket upright and at a right angle to the base.

9. A pet feeding apparatus as recited in claim 1, wherein the bracket is adapted to mount on a vertical support surface such as a wall.

10. A pet feeding apparatus as recited in claim 9, wherein the tray is horizontal in the lower position, while in the upper position the tray stands above the tray hinge with the tray resting against the bracket.

\* \* \* \* \*